US011366650B1

(12) United States Patent
Jayachandran et al.

(10) Patent No.: US 11,366,650 B1
(45) Date of Patent: Jun. 21, 2022

(54) AUTOMATIC GENERATION OF AFFINITY AND ANTI-AFFINITY RULES

(71) Applicant: International Business Machines Corporation, Armonk, NY (US)

(72) Inventors: Praveen Jayachandran, Bangalore (IN); Amith Singhee, Bangalore (IN); Ashok Pon Kumar Sree Prakash, Bangalore (IN); Chander Govindarajan, Chennai (IN); Venkatraman Ramakrishna, Bangalore (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 17/112,193

(22) Filed: Dec. 4, 2020

(51) Int. Cl.
  *G06F 8/60* (2018.01)
  *G06F 8/20* (2018.01)
  *G06F 8/10* (2018.01)

(52) U.S. Cl.
  CPC ............. *G06F 8/60* (2013.01); *G06F 8/10* (2013.01); *G06F 8/20* (2013.01)

(58) Field of Classification Search
  CPC .............. G06F 8/60; G06F 8/10; G06F 8/20
  USPC .............................. 717/168–176; 706/45–48
  See application file for complete search history.

(56) References Cited

U.S. PATENT DOCUMENTS

| 8,117,143 B2* | 2/2012 | Bradski ............... G06K 9/6215 706/45 |
| 8,490,150 B2* | 7/2013 | Hadar ................ G06F 9/45558 726/1 |
| 8,589,555 B2* | 11/2013 | Chen .................... G06F 9/5066 709/219 |

(Continued)

FOREIGN PATENT DOCUMENTS

CN     110719335 A     1/2020

OTHER PUBLICATIONS

Santos et al, "Towards Network-Aware Resource Provisioning in Kubernetes for Fog Computing applications", IEEE, pp. 351-359 (Year: 2019).*

(Continued)

*Primary Examiner* — Anil Khatri
(74) *Attorney, Agent, or Firm* — Ference & Associates LLC

(57) ABSTRACT

One embodiment provides a computer implemented method, including: receiving an application to be deployed on a container-based environment; obtaining a specification for the application including information regarding a portion of the application contained within a given container; extracting portion information corresponding to connections between different portions of the application and interferences between different portions of the application; identifying affinity indicators and anti-affinity indicators for the portions of the application, wherein the affinity indicators are based upon the connections between different portions of the application and wherein the anti-affinity indicators are (Continued)

based upon the interferences between different portions of the application; and constructing affinity rules and anti-affinity rules for the containers by combining the affinity indicators to construct affinity rules and combining the anti-affinity indicators to construct anti-affinity rules.

18 Claims, 5 Drawing Sheets

(56) References Cited

U.S. PATENT DOCUMENTS

| | | | | |
|---|---|---|---|---|
| 8,856,109 | B2* | 10/2014 | Karidi | G06F 16/9535 |
| | | | | 707/723 |
| 9,052,935 | B1* | 6/2015 | Rajaa | G06F 9/5077 |
| 9,367,362 | B2* | 6/2016 | Kern | G06F 9/5033 |
| 9,411,622 | B2* | 8/2016 | Zhu | G06F 9/5072 |
| 9,652,271 | B2* | 5/2017 | Cropper | G06F 9/45533 |
| 9,723,048 | B2* | 8/2017 | Cosmadopoulos | H04L 69/28 |
| 9,846,589 | B2* | 12/2017 | Udupi | G06F 9/45558 |
| 9,965,308 | B2* | 5/2018 | Sarkar | H04L 41/0893 |
| 10,198,250 | B1 | 2/2019 | Sharma et al. | |
| 10,817,380 | B2* | 10/2020 | Alluboyina | G06F 11/1464 |
| 10,838,756 | B2* | 11/2020 | Singh | G06F 9/45558 |
| 11,055,273 | B1* | 7/2021 | Meduri | G06F 16/2474 |
| 11,094,002 | B1* | 8/2021 | Allin | G06N 20/00 |
| 11,190,956 | B2* | 11/2021 | Jeuk | H04W 48/08 |
| 2013/0097319 | A1 | 4/2013 | Ahmad et al. | |
| 2015/0193244 | A1 | 7/2015 | Cropper | |
| 2016/0381133 | A1 | 12/2016 | Palavalli et al. | |
| 2018/0136931 | A1 | 5/2018 | Hendrich et al. | |
| 2018/0341598 | A1 | 11/2018 | Patel et al. | |

OTHER PUBLICATIONS

Liscano et al., "Supporting SIP Port Mapping and RTP Affinity Constraints in Container Orchestration Environments", IEEE, pp. 13-19 (Year: 2021).*

Janarthanan et al, "Policies Based Container Migration Using Cross—Cloud Management Platform", IEEE, pp. 1-6 (Year: 2018).*

Chen et al, "AAGA: Affinity-Aware Grouping for Allocation of Virtual Machines", IEEE, pp. 235-242 (Year: 2013).*

Bouten et al, "Semantically Enhanced Mapping Algorithm for Affinity-Constrained Service Function Chain Requests", IEEE, pp. 317-331 (Year: 2017).*

Ji, "Affinity-Based Management of Main Memory Database Clusters", ACM, pp. 307-339 (Year: 2002).*

Red Hat Openshift, "Placing pods relative to other pods using affinity and anti-affinity rules", Accessed on Jul. 15, 2020, 10 pages, Red Hat Openshift.

Alberto Losada Grande, "Advanced scheduling using affinity and anti-affinity rules", Feb. 25, 2020, 20 pages, Blog.

Chinese National Intellectual Property Administration, International Search Report and Written Opinion, dated Jan. 26, 2022, 8 pages.

* cited by examiner

US 11,366,650 B1

AUTOMATIC GENERATION OF AFFINITY AND ANTI-AFFINITY RULES

BACKGROUND

With the increase in remote computing or services environments, for example, remote network environments, cloud computing environments, and the like, more users and entities are moving the hosting of applications and other services to the services environment. By moving the hosting of applications and other services to the services environment, the users and other entities are able to reduce the use of internal resources (e.g., infrastructure, computing resources, human resources, etc.) and reduce other costs associated with the application and other services. Additionally, since the services environment usually has significantly more resources, particularly, computing resources, than the user or entity has locally, the user or entity is able to scale the application that is being hosted on the services environment. Thus, the use of services environments is very attractive to application entities.

BRIEF SUMMARY

In summary, one aspect of the invention provides a computer implemented method, including: receiving an application to be deployed on a container-based environment, wherein the application is split into containers including portions of the application; obtaining a specification for the application including information regarding a portion of the application contained within a given container; extracting, from the specification, portion information corresponding to connections between different portions of the application and interferences between different portions of the application; identifying, from the portion information, affinity indicators and anti-affinity indicators for the portions of the application, wherein the affinity indicators are based upon the connections between different portions of the application and wherein the anti-affinity indicators are based upon the interferences between different portions of the application; and constructing affinity rules and anti-affinity rules for the containers by combining the affinity indicators to construct affinity rules and combining the anti-affinity indicators to construct anti-affinity rules, wherein the affinity rules identify containers to be hosted by the same host on the container-based environment and wherein the anti-affinity rules identify containers to be hosted by different hosts on the container-based environment.

Another aspect of the invention provides an apparatus, including: at least one processor; and a computer readable storage medium having computer readable program code embodied therewith and executable by the at least one processor; wherein the computer readable program code includes code that receives an application to be deployed on a container-based environment, wherein the application is split into containers including portions of the application; wherein the computer readable program code includes code that obtains a specification for the application including information regarding a portion of the application contained within a given container; wherein the computer readable program code includes code that extracts, from the specification, portion information corresponding to connections between different portions of the application and interferences between different portions of the application; wherein the computer readable program code includes code that identifies, from the portion information, affinity indicators and anti-affinity indicators for the portions of the application, wherein the affinity indicators are based upon the connections between different portions of the application and wherein the anti-affinity indicators are based upon the interferences between different portions of the application; and wherein the computer readable program code includes code that constructs affinity rules and anti-affinity rules for the containers by combining the affinity indicators to construct affinity rules and combining the anti-affinity indicators to construct anti-affinity rules, wherein the affinity rules identify containers to be hosted by the same host on the container-based environment and wherein the anti-affinity rules identify containers to be hosted by different hosts on the container-based environment.

An additional aspect of the invention provides a computer program product, including: a computer readable storage medium having computer readable program code embodied therewith, the computer readable program code executable by a processor; wherein the computer readable program code includes code that receives an application to be deployed on a container-based environment, wherein the application is split into containers including portions of the application; wherein the computer readable program code includes code that obtains a specification for the application including information regarding a portion of the application contained within a given container; wherein the computer readable program code includes code that extracts, from the specification, portion information corresponding to connections between different portions of the application and interferences between different portions of the application; wherein the computer readable program code includes code that identifies, from the portion information, affinity indicators and anti-affinity indicators for the portions of the application, wherein the affinity indicators are based upon the connections between different portions of the application and wherein the anti-affinity indicators are based upon the interferences between different portions of the application; and wherein the computer readable program code includes code that constructs affinity rules and anti-affinity rules for the containers by combining the affinity indicators to construct affinity rules and combining the anti-affinity indicators to construct anti-affinity rules, wherein the affinity rules identify containers to be hosted by the same host on the container-based environment and wherein the anti-affinity rules identify containers to be hosted by different hosts on the container-based environment.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
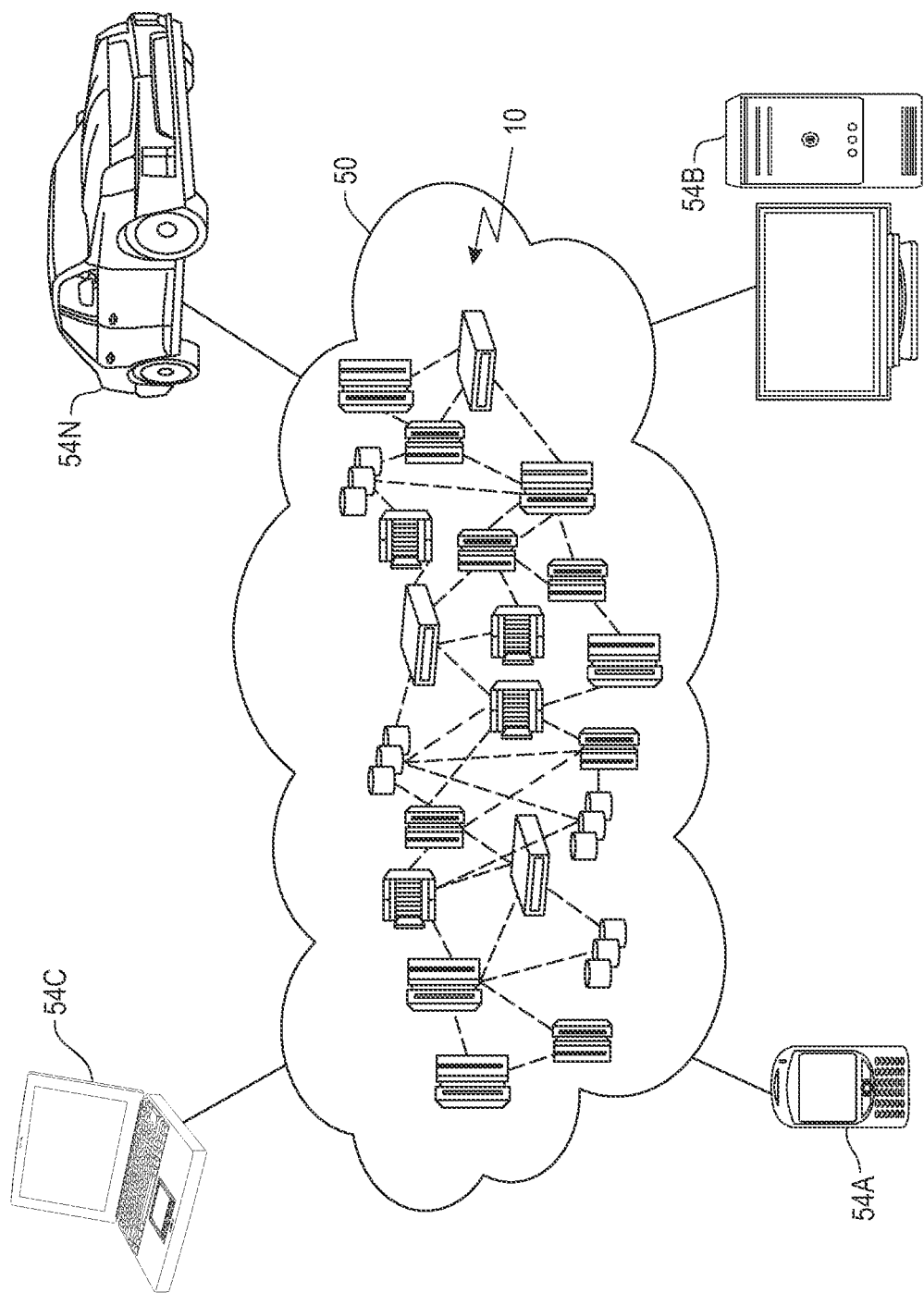
FIG. 1 depicts a cloud computing environment according to an embodiment of the present invention.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resource but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
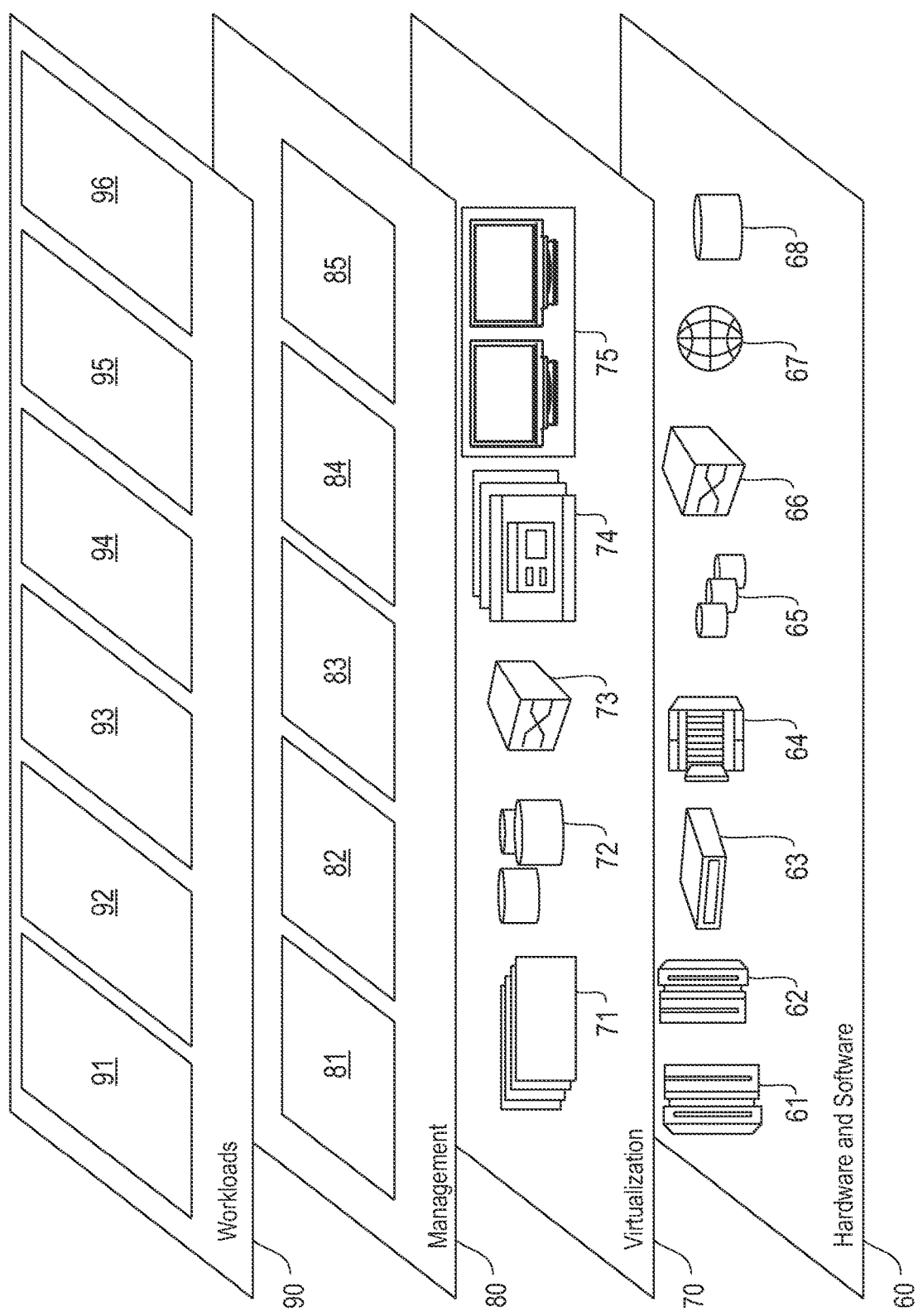
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and services hosting 96.

When an application is deployed to a services environment controlled by an entity other than the developing entity, the services environment entity controls many different aspects of the application with respect to the services environment. For example, the services environment entity controls where the application is placed within the services environment, what resources are assigned to the application, and the like. In the context of this application, a services environment refers to not only a services environment that is hosted in a completely remote location, but also to a services environment that may be on-premises or within a private cloud. Rather, the term services environment refers to a services environment where the application entity does not have complete knowledge or control of the deployment environment and other applications that may be hosted within the services environment. Problems may arise when the application is split into different portions, for example, split into containers with each container containing a portion of the application. When deployed on the services environment, the services environment entity chooses the location of each of these different portions or containers on the services environment. The services environment entity also chooses what resources to assign to each container, which containers are going to be grouped together (e.g., in a cluster, in a pod, etc.), and the like.

Since the services environment entity does not have knowledge of the application, these selections are arbitrary and based upon attributes of the services environment and not attributes of the application. This arbitrary selection can cause problems with the performance of the application as a whole, for example, reducing application processing speed and accuracy, creating interferences between application portions, reducing desired application redundancy, and the like. These problems occur because different application portions may be connected and, therefore, should be hosted by the same host or may cause interferences with other application portions and, therefore, should be hosted by different hosts.

One technique for addressing these issues is to allow the application entity to designate affinity and anti-affinity rules. Affinity rules identify those application portions or containers that should be hosted by the same host on the services environment. Anti-affinity rules identify those application portions or containers that should be hosted by different hosts on the services environment. By designating these affinity and anti-affinity rules, the services environment knows which application portions or containers should be kept together or kept separate from each other. However, the application entity may not know which application portions or containers should be kept together or kept separate from each other. Thus, while the ability to designate the affinity and anti-affinity rules is useful, this ability is not very helpful if the application entity does not know the rules that should be designated, which is a very common problem.

Accordingly, an embodiment provides a system and method for automatically generating affinity and anti-affinity rules for an application split into containers by extracting affinity and anti-affinity indicators from information corresponding to portions contained within the containers. The system receives an application to be deployed on a container-based environment, for example, a services environment. Since the application is being deployed on a container-based environment, the application is split into containers that contain different portions of the application. The system obtains a specification for the application that identifies information regarding each of the portions of the application contained within the containers. This information may include, for example, interactions between application portions, application portion relationships, application portion constraints, fault tolerance requirements, and the like.

From the specification the system can extract information regarding the portions or containers and, more specifically, connections between different portions of the application and interferences between different portions of the application. For example, the system may identify that two portions contained within different containers interact frequently. As another example, the system may identify that two portions contained within different containers require large amounts of the same processing resource (e.g., memory, storage, processors, hardware, etc.). Thus, from the extracted information regarding the portions or containers, the system can identify affinity indicators and anti-affinity indicators. The affinity indicators indicate portions of the application that work with or rely on other portions of the application. The anti-affinity indicators indicate portions of the application that compete with or interfere with other portions of the application. From the affinity and anti-affinity indicators, the system can construct affinity and anti-affinity rules for the containers, thereby providing an automated technique for identifying and constructing the affinity and anti-affinity rules instead of relying on the application entity to manual identify these rules.

Such a system provides a technical improvement over current systems for deploying applications on a container-based environment. Rather than an application entity needing to manually designate affinity and anti-affinity rules, the described system and method is able to automatically identify and generate the affinity and anti-affinity rules from an input specification for the application. The described system and method is able to extract information corresponding to each application or container from the input specification and, from this information, extract affinity and anti-affinity indicators. The affinity and anti-affinity indicators can be grouped to construct the affinity and anti-affinity rules. Accordingly, rather than requiring the application entity to manually designate the affinity and anti-affinity rules which may be unknown to the application entity, the described system is able to make these designations automatically. Thus, the described system and method provides a system that more accurately generates affinity and anti-affinity rules than the manual techniques. The more accurate affinity and anti-affinity rules allows for an application that performs better than inaccurate or non-existent affinity and anti-affinity rules and provided with conventional techniques.

Figure 3:
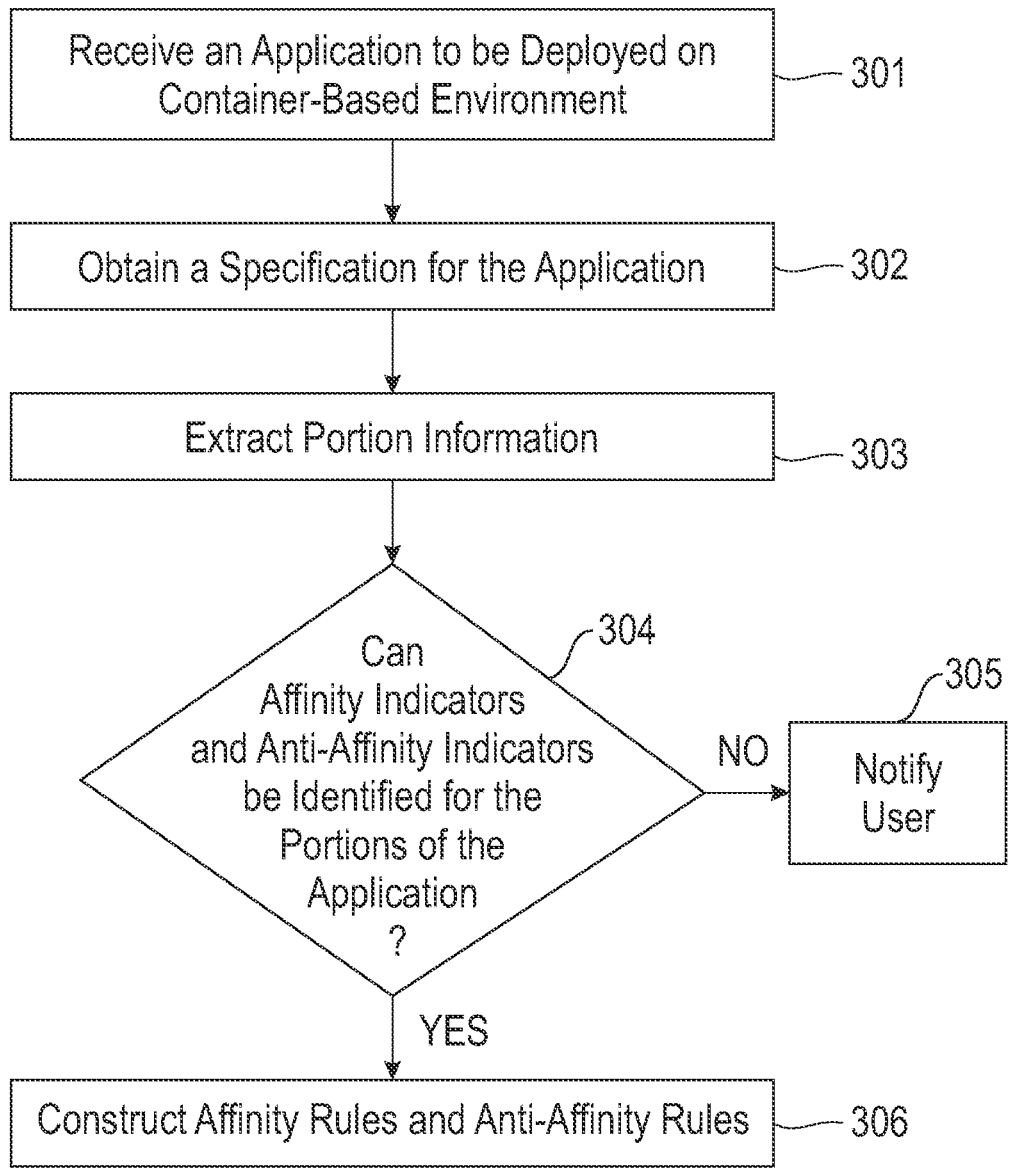
FIG. 3 illustrates a method of automatically generating affinity and anti-affinity rules for an application split into containers by extracting affinity and anti-affinity indicators from information corresponding to portions contained within the containers.

FIG. 3 illustrates a method for automatically generating affinity and anti-affinity rules for an application split into containers by extracting affinity and anti-affinity indicators from information corresponding to portions contained within the containers. At 301 the system receives an application to be deployed on a container-based environment. The deployment may include an entire application being deployed onto a new cluster or pod within the container-based environment, one or more processes or services of an application being deployed within the container-based environment that is already hosting other services, updating an already deployed application with affinity and anti-affinity rules, or the like. Receiving the application may include any technique for obtaining the application including, but not limited to, a user uploading or otherwise providing the application to the system or to the services environment, the system or services environment accessing a location of the application, a user providing a link or pointer to the application, or the like. The described system and method may be a stand-alone application, may be an add-on or supplement application to the services environment, may be run locally before deploying the application to the services environment, may be run by the services environment, or the like.

Since the application is to be deployed on a container-based environment, the application is split into containers that each contains one or more portions or processes of the application. For ease of readability, the term portion will be used throughout to refer to the portion or portions of the application contained within a single container, and the term portion is not intended to limit this disclosure to a single portion or process within each container. In other words, a container may contain more than one process or portion of the application, but will be referred to as a portion for readability. The application may be split into containers by the entity that developed, owns, or otherwise controls the application, referred to herein as the application entity.

Upon receiving the application, the system obtains a specification for the application at 302. The specification includes information regarding each of the portions of the application within the containers. For example, the specification identifies the process that is represented by the portion and contained within the container, what resources are required to run the portion, how many copies of the portion need to be run on the services environment, and the like. In other words, the specification provides information for identifying the process and constraints and/or requirements of the process contained within each container. The specification may be in the form of source code, developer comments, configuration files, the like, or a combination thereof. Generally, it is likely that all of the containers for a single application will be contained within a single specification. However, the described system and method allows for gathering the information for containers from multiple specifications, if applicable. Nonetheless, the term specification will be used throughout for ease of readability but is not intended to limit the scope of this disclosure to a single specification.

At 303 the system extracts portion information from the specification. The portion information corresponds to connections between different portions of the application, for example, interactions between portions, relationships and/or dependencies between portions, common resource requirements or constraints between portions, and the like. The portion information may also identify connections between different applications and/or services that are being hosted within the environment, for example, an application not related to or created by the application entity. The portion information also identifies interferences between different portions of the application or between the application and other applications or services co-hosted on the environment, for example, competing resource requirements or constraints, fault tolerance requirements, placement constraints, and the like. In extracting interactions, the system may generate or access a topology of connections between portions of the application.

Placement constraints may identify that a particular portion needs to be placed at a location on the services environment that is able to meet a particular requirement or preference of the portion, for example, a particular hardware requirement/preference, a particular software requirement/preference, a particular processing requirement/preference, or the like. Fault tolerance requirements identify that instances of a portion need to be hosted on different hosts within the services environment in order to ensure redundancy in the event that a portion of the remote service environment experiences a fault or outage. For example, it may be identified the three instances or copies of a portion need to be running on the services environment and that all three should be hosted by separate or different hosts in order to prevent a complete loss of the service represented by the portion in the event of a fault or outage of a portion of the services environment.

From the extracted portion information, the system determines if affinity indicators and anti-affinity indicators can be identified for the portions of the application at 304. Affinity indicators indicate portions that should be kept together or hosted by the same host on the services environment. Thus, affinity indicators are based upon the connections between different portions of the application. Anti-affinity indicators indicate portions that should be kept separate or hosted by different hosts on the services environment. Thus, anti-affinity indicators are based upon the interferences between different portions of the application. Additionally, the system can identify pod design indicators from the extracted portion information. A pod design is the cluster or grouping of portions on the services environment system. Some non-inclusive examples of identifying affinity indicators and/or pod design indicators from portion information follow. However, these are merely examples and other techniques are contemplated and possible.

As a first example of identifying an affinity indicator, the system may identify interactions between portions that would indicate that some portions communicate with each other. The system may also determine the frequency of communication to determine a strength of the affinity indicator. To identify interactions the system may access service interactions and network configurations. Within the service interactions may be defined links that connect one application portion to another application portion. Such defined links suggest an affinity between the linked portions. A user may also define networks between portions of an application. The networks identify a group of portions that are all connected together to allow communication between the portions within the network, but isolated from other portions that are not on the network. Thus, the network suggests an affinity between those portions included within the defined network. Information corresponding to ports may be used to infer the type of service that a portion is running and as an indicator for how strong a link is in terms of affinity.

Another example of an affinity indicator is relationships and/or dependencies between portions. Particular terms used within the specification may indicate a relationship or dependency between portions. For example, a certain term may indicate that a particular portion is dependent upon another portion. The system may also identify service relationships from files. For example, multiple service definitions included in a single file may be an indicator of affinity, especially if the configuration is divided into a large number of files. Some files may indicate service function chains that are indicators of close service interactions and, accordingly, affinity between those services or portions. The files may also be an indicator that a group of portions should be kept together in the same pod. For example, those portions represented within the connected files are a pod design indicator indicating that those portions should be grouped or clustered together.

Another example of an affinity indicator is storage requirements between portions. Portions accessing a shared storage volume may indicate an affinity between the portions. These portions are also candidates to be placed together within the same cluster or pod so that only a single pod accesses the shared storage volume, thereby reducing the number of remote reads that would occur by placing portions on different pods. Storage or other resource requirements may also be an anti-affinity indicator. The system may identify those portions that have large resource requirements, for example, memory requirements, processing requirements, storage requirements, and the like. In the event that multiple portions have the same large resource requirements, this may be an anti-affinity indicator. For example, if two portions that are not otherwise affine or have a strong affinity both need large amounts of memory resources, hosting these portions on the same host may bog down the memory resources and reduce the performance of not only these portions, but also any other portions hosted by the same host.

Another example of an affinity or anti-affinity indicator is placement constraints. Placement constraints identify any special requirements or preferences (e.g., hardware requirements, software requirements, processing requirements, etc.) needed or requested by a portion that can only be met by certain hosts of the services environment. Therefore, these portions can only be placed on a location within the services environment that can meet these requirements. Placement constraints may include hard constraints which are requirements and may include soft constraints which are preferences. For example, a portion needing a particular hardware resource to function is a hard constraint or requirement, whereas a portion that performs better with a particular hardware resource is a soft constraint or preference. Additionally, portions that have the same placement constraints may indicate an affinity, whereas portions that are suggested to be separated may indicate an anti-affinity.

A final example of an anti-affinity indicator is a fault tolerance requirement. The application may require that multiple copies, replicas, or instances of a particular portion are run on the services environment. One reason for requiring multiple copies is in order to prevent the service corresponding to a portion from becoming unavailable in the event of a fault or outage. In other words, the service corresponding to the portion may be a critical service that needs to be operational in order to keep the application operational. Thus, the system may designate that multiple copies of the service are running to ensure operation of the application. Accordingly, these copies should not be hosted on the same host in order to better ensure that at least one copy will be functioning in the event of a fault or outage on the services environment. Therefore, an indication of replicas or copies is an anti-affinity indicator between the copies or instances.

If affinity and anti-affinity indicators cannot be identified at 304, the system may notify a user at 305. The user can then either provide additional input information so that the indicators can be identified or may manually provide the affinity and anti-affinity rules. On the other hand, if the indicators can be identified at 304, the system automatically constructs the affinity and anti-affinity rules based upon the affinity and anti-affinity indicators. To construct the rules, the system combines the affinity indicators into affinity rules that identify containers or portions to be hosted by the same host on the container-based environment. The system also combines the anti-affinity indicators into anti-affinity rules that identify containers or portions that should be kept separate or hosted by different hosts on the container-based environment. Additionally, the system can combine the pod design indicators into pod design rules that indicate portions of the application that should be included within the same pod of the container-based environment to construct a pod design for the application within the container-based environment.

The rules can be constructed by combining the indicators in one of, or a combination of, approaches. Some approaches are described as follows. However, this is a non-exhaustive list of examples and other approaches are possible and contemplated. A first approach includes a rule-based approach. In this approach rules are created that indicate if an affinity or anti-affinity indicator is present, then the portions having the affinity or anti-affinity will be placed together or kept separate, respectively. The rules can also be more complicated in that a certain number of affinity or anti-affinity indicators must be present in order to make a determination regarding the placement of the containers. Additionally, weights can be added to the indicators. For example, a certain indicator may have more weight than another indicator. The system can then determine that if the weight of the indicators meet or exceed a particular threshold, then a decision regarding placement can be made.

Another approach is utilizing precedence or priority rules for determining portion placement. A user, application entity, described system, or the like, may assign a particular precedence or priority to certain affinity or anti-affinity indicators. Thus, if one of these indicators is present, the system gives precedence or priority to that indicator and takes the action with respect to placement based upon that indicator. This approach might include building a precedence hierarchy of meta constraints and assign normalized weights to each. The system then collects inferred affinity and anti-affinity rules, which may include confidence weights. These rules are further refined based upon the meta constraint weights, thereby either amplifying or attenuating the weight of these rules. Based upon these refined rules, the system can identify different possible scenarios for portion placement that would satisfy these rules. The system can then solve a constraint satisfaction problem to determine the final placement of the portions.

A final example approach is an iterative user-guided analysis, also referred to as a what-if analysis. In this approach the user or an administrator is presented with an initial set of rules and the resulting portion placement. The user can then provide feedback or input identifying any changes to the priority of one or more of the rules. Changes to the priority of rules may result in a change to the placement of portions. Accordingly, the system re-runs the placement analysis based upon the user feedback and presents this new portion placement to the user. The user can then provide additional input or feedback changing rule priorities, thereby resulting in the system re-running the analysis and generating a new portion placement. This process can be iteratively run until the user is satisfied with the placement of portions within the remote service environment. Once the user confirms the portion placement, the confirmed placement can be implemented.

Once the affinity and anti-affinity rules and pod design are constructed, the portions of the application can be placed on the services environment per the rules. In other words, once the affinity and anti-affinity rules are constructed, the system can deploy the application on the services environment by placing the portions within the environment per the rules. Additionally, the portions can be placed within clusters or pods on the services environment per the pod design.

Figure 4:
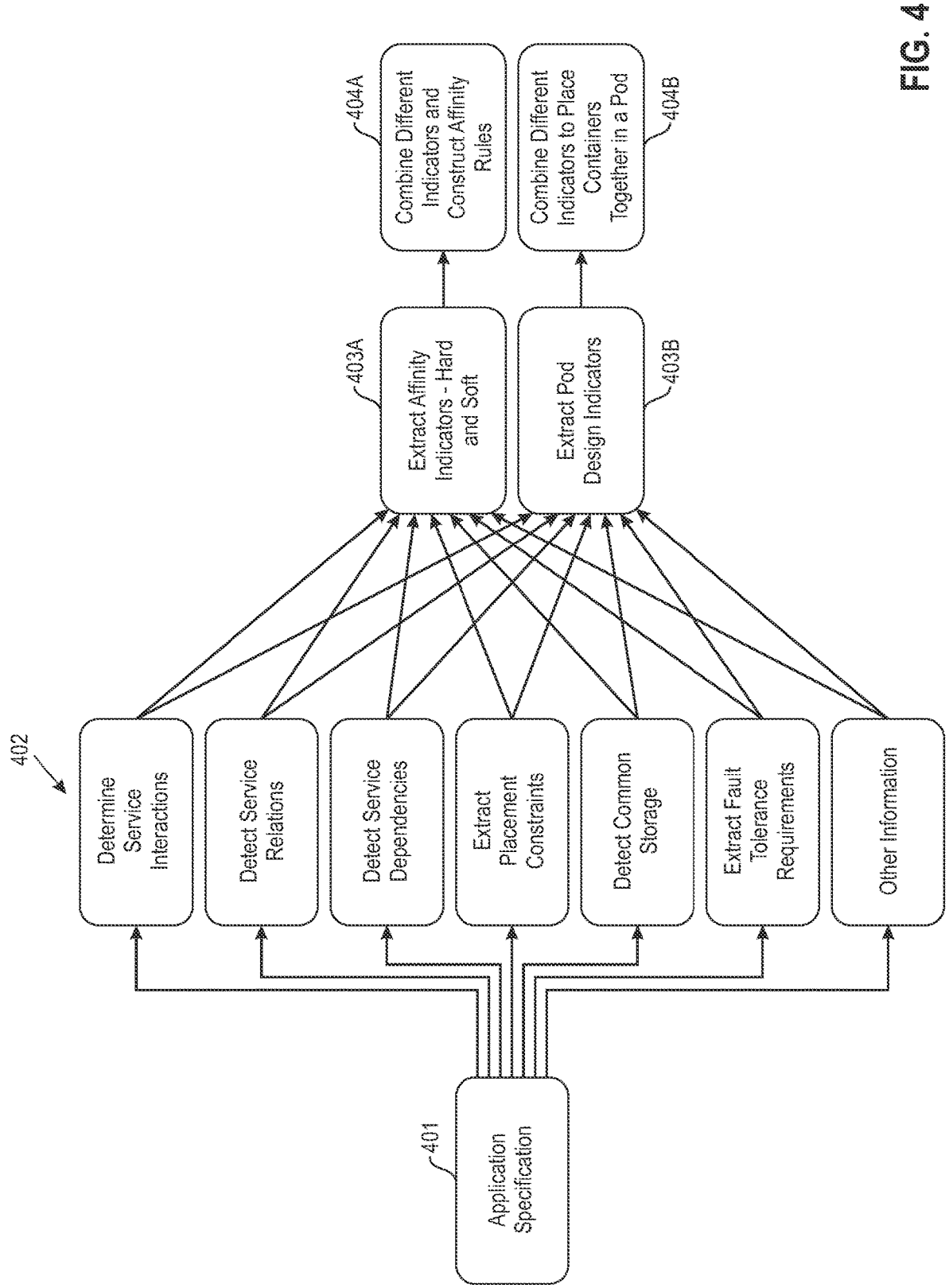
FIG. 4 illustrates an overall system architecture for automatically generating affinity and anti-affinity rules for an application split into containers by extracting affinity and anti-affinity indicators from information corresponding to portions contained within the containers.

FIG. 4 illustrates an overall system architecture of the described system and method. An application specification 401 is received at the system. From the application specification, the system identifies portion information 402, for example, by determining service interactions, detecting service relations, detecting service dependencies, extracting placement constraints, detecting common storage, extracting fault tolerance requirements, and any other information. From the portion information, the system can extract affinity and anti-affinity indicators 403A and pod design indicators 403B. The affinity and anti-affinity indicators 403A may include both hard and soft indicators which designate whether the indicator is a requirement or a preference, respectively. The extracted affinity and anti-affinity indicators 403A can be combined to construct affinity and anti-affinity rules 404A. The pod design indicators can be combined to identify a pod design that indicates what containers should be placed together within a pod on the container-based environment 404B.

Figure 5:
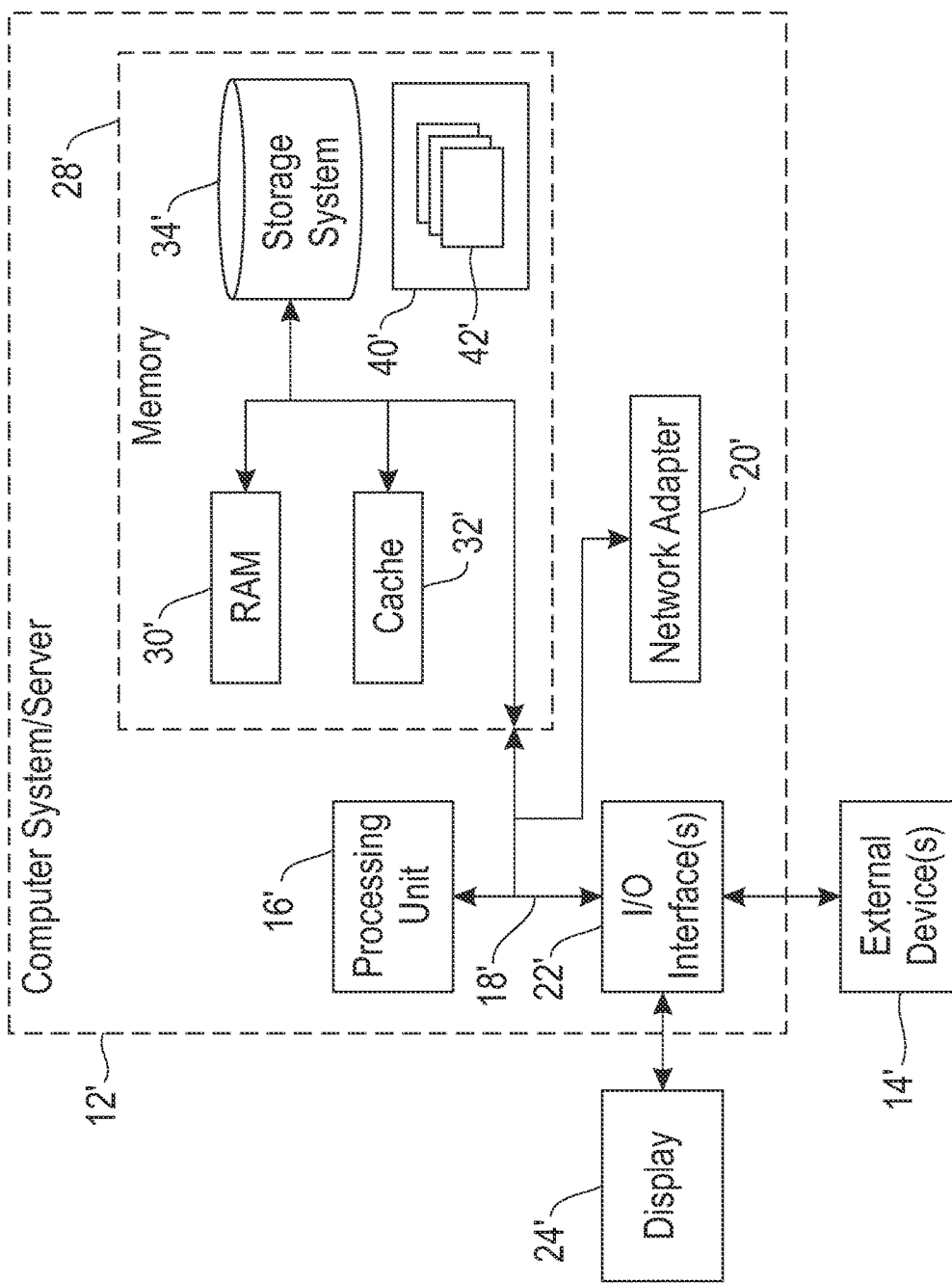
FIG. 5 illustrates a computer system.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method, comprising:
   receiving an application to be deployed on a container-based environment, wherein the application is split into containers comprising portions of the application;
   obtaining a specification for the application comprising information regarding a portion of the application contained within a given container;
   extracting, from the specification, portion information corresponding to connections between different portions of the application and interferences between different portions of the application;
   identifying, from the portion information, affinity indicators and anti-affinity indicators for the portions of the application, wherein the affinity indicators are based upon the connections between different portions of the application and wherein the anti-affinity indicators are based upon the interferences between different portions of the application;
   constructing affinity rules and anti-affinity rules for the containers by combining the affinity indicators to construct affinity rules and combining the anti-affinity indicators to construct anti-affinity rules, wherein the affinity rules identify containers to be hosted by the same host on the container-based environment and wherein the anti-affinity rules identify containers to be hosted by different hosts on the container-based environment, wherein the combining the affinity indicators and the combining the anti-affinity indicators comprises obtaining priority constraints from a user, identifying affinity indicators and anti-affinity indicators to be given higher weights than other affinity indicators and anti-affinity indicators and incorporating the priority constraints into constructing the affinity rules and the anti-affinity rules by building a precedence hierarchy of meta constraints and assigning normalized weights to the meta constraints; and
   presenting the affinity rules and anti-affinity rules to a user; and
   modifying the affinity rules and anti-affinity rules based upon input from the user.

2. The computer implemented method of claim 1, comprising identifying, from the portion information, pod design indicators indicating portions of the application to be included within a pod of the container-based environment.

3. The computer implemented method of claim 2, comprising constructing, utilizing the pod design indicators, a pod design for the application within the container-based environment.

4. The computer implemented method of claim 1, wherein the combining the affinity indicators and combining the anti-affinity indicators comprises utilizing a rule-based technique.

5. The computer implemented method of claim 1, wherein the combining the affinity indicators and combining the anti-affinity indicators comprises performing an iterative user-guided analysis, wherein the iterative user-guided analysis comprises iteratively (i) performing the presenting the affinity rules and anti-affinity rules to a user, (ii) receiving input from a user changing a priority of at least one of: the affinity rules and the anti-affinity rules, and (iii) performing the modifying the affinity rules and anti-affinity rules based upon the input from the user.

6. The computer implemented method of claim 1, wherein the identifying affinity indicators comprises identifying interactions between application portions from service interactions and network configurations.

7. The computer implemented method of claim 1, wherein the identifying affinity indicators and identifying anti-affinity indicators comprises identifying resource requirements of the portions that indicate one of: no resource interference between application portions and a resource interference between application portions.

8. The computer implemented method of claim 1, wherein the identifying anti-affinity indicators comprises identifying a number of instances of a given portion to be deployed on the container-based environment and identifying fault tolerance requirements across the number of instances.

9. The computer implemented method of claim 1, wherein the portion information comprises interactions between application portions, application portion relationships, application portion constraints, and fault tolerance requirements.

10. An apparatus, comprising:
   at least one processor; and
   a non-transitory computer readable storage medium having computer readable program code embodied therewith and executable by the at least one processor;
   wherein the computer readable program code comprises code that receives an application to be deployed on a container-based environment, wherein the application is split into containers comprising portions of the application;
   wherein the computer readable program code comprises code that obtains a specification for the application comprising information regarding a portion of the application contained within a given container;
   wherein the computer readable program code comprises code that extracts, from the specification, portion information corresponding to connections between different portions of the application and interferences between different portions of the application;
   wherein the computer readable program code comprises code that identifies, from the portion information, affinity indicators and anti-affinity indicators for the portions of the application, wherein the affinity indicators are based upon the connections between different portions of the application and wherein the anti-affinity indicators are based upon the interferences between different portions of the application;
   wherein the computer readable program code comprises code that constructs affinity rules and anti-affinity rules for the containers by combining the affinity indicators to construct affinity rules and combining the anti-affinity indicators to construct anti-affinity rules, wherein the affinity rules identify containers to be hosted by the same host on the container-based environment and wherein the anti-affinity rules identify containers to be hosted by different hosts on the container-based environment, wherein the combining the affinity indicators and the combining the anti-affinity indicators comprises obtaining priority constraints from a user identifying affinity indicators and anti-affinity indicators to be given higher weights than other affinity indicators and anti-affinity indicators and incorporating the priority constraints into constructing the affinity rules and the anti-affinity rules by building a precedence hierarchy of meta constraints and assigning normalized weights to the meta constraints; and
   wherein the computer readable program code comprises code that presents the affinity rules and anti-affinity rules to a user; and
   wherein the computer readable program code comprises code that modifies the affinity rules and anti-affinity rules based upon input from the user.

11. A computer program product, comprising:
   a non-transitory computer readable storage medium having computer readable program code embodied therewith, the computer readable program code executable by a processor;
   wherein the computer readable program code comprises code that receives an application to be deployed on a container-based environment, wherein the application is split into containers comprising portions of the application;
   wherein the computer readable program code comprises code that obtains a specification for the application comprising information regarding a portion of the application contained within a given container;
   wherein the computer readable program code comprises code that extracts, from the specification, portion information corresponding to connections between different portions of the application and interferences between different portions of the application;
   wherein the computer readable program code comprises code that identifies, from the portion information, affinity indicators and anti-affinity indicators for the portions of wherein the affinity indicators are based upon the connections between different portions of the application and wherein the anti-affinity indicators are based upon the interferences between different portions of the application;
   wherein the computer readable program code comprises code that constructs affinity rules and anti-affinity rules for the containers by combining the affinity indicators to construct affinity rules and combining the anti-affinity indicators to construct anti-affinity rules, wherein the affinity rules identify containers to be hosted by the same host on the container-based environment and wherein the anti-affinity rules identify containers to be hosted by different hosts on the container-based environment, wherein the combining the affinity indicators and the combining the anti-affinity indicators comprises obtaining priority constraints from a user identifying affinity indicators and anti-affinity indicators to be given higher weights than other affinity indicators and anti-affinity indicators and incorporating the priority constraints into constructing the affinity rules and the anti-affinity rules by building a precedence hierarchy of meta constraints and assigning normalized weights to the meta constraints; and
   wherein the computer readable program code comprises code that presents the affinity rules and anti-affinity rules to a user; and
   wherein the computer readable program code comprises code that modifies the affinity rules and anti-affinity rules based upon input from the user.

12. The computer program product of claim 11, comprising identifying, from the portion information, pod design indicators indicating portions of the application to be included within a pod of the container-based environment.

13. The computer program product of claim 12, comprising constructing, utilizing the pod design indicators, a pod design for the application within the container-based environment.

14. The computer program product of claim 11, wherein the combining the affinity indicators and combining the anti-affinity indicators comprises utilizing a rule-based technique.

15. The computer program product of claim 11, wherein the combining the affinity indicators and combining the anti-affinity indicators comprises performing an iterative user-guided analysis, wherein the iterative user-guided analysis comprises iteratively (i) performing the presenting the affinity rules and anti-affinity rules to a user, (ii) receiving input from a user changing a priority of at least one of: the affinity rules and the anti-affinity rules, and (iii) performing the modifying the affinity rules and anti-affinity rules based upon the input from the user.

16. The computer program product of claim 11, wherein the identifying affinity indicators comprises identifying interactions between application portions from service interactions and network configurations.

17. The computer program product of claim 11, wherein the identifying affinity indicators and identifying anti-affinity indicators comprises identifying resource requirements of the portions that indicate one of: no resource interference between application portions and a resource interference between application portions.

18. The computer program product of claim 11, wherein the identifying anti-affinity indicators comprises identifying a number of instances of a given portion to be deployed on the container-based environment and identifying fault tolerance requirements across the number of instances.

* * * * *